US011792458B2

(12) United States Patent
Cho et al.

(10) Patent No.: US 11,792,458 B2
(45) Date of Patent: *Oct. 17, 2023

(54) MANAGING CONCURRENT CONTENT PLAYBACK

(71) Applicant: Comcast Cable Communications, LLC, Philadelphia, PA (US)

(72) Inventors: Suk-Hyun Cho, Federal Way, WA (US); William Thing, Seattle, WA (US); Eugene Parker, Renton, WA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,270

(22) Filed: Jul. 13, 2022

(65) Prior Publication Data

US 2023/0031833 A1 Feb. 2, 2023

Related U.S. Application Data

(63) Continuation of application No. 16/887,160, filed on May 29, 2020, now Pat. No. 11,425,434, which is a
(Continued)

(51) Int. Cl.
*H04N 21/24* (2011.01)
*G06F 21/33* (2013.01)
(Continued)

(52) U.S. Cl.
CPC ....... *H04N 21/2407* (2013.01); *G06F 21/335* (2013.01); *G06F 21/6218* (2013.01); *H04N 21/44204* (2013.01)

(58) Field of Classification Search
CPC .... G06F 21/10; G06F 21/335; G06F 21/6218; H04N 21/2407; H04N 21/2541; H04N 21/44204; H04N 21/8456
See application file for complete search history.

(56) References Cited

U.S. PATENT DOCUMENTS 5,411,493 A * 5/1995 Rodriguez ................ A61F 7/02
604/290
6,423,047 B1 * 7/2002 Webster ................ A61F 13/505
604/397
(Continued)

OTHER PUBLICATIONS

US Patent Application filed on May 29, 2020, entitled "Managing Concurrent Content Playback", U.S. Appl. No. 16/887,160.

*Primary Examiner* — Michael B. Pierorazio
(74) *Attorney, Agent, or Firm* — BakerHostetler

(57) ABSTRACT

A content server may receive from a user device a request for a content asset and may send to the playback device a permit for accessing the content asset. The permit may be used by the content server in order to enforce a concurrency restriction, or a number of concurrent playbacks of one or more content assets desired or permitted by the playback device. In response to receiving a request for a content asset segment associated with a content asset, the content server may determine whether the number of permits currently granted to the playback device exceeds the number of desired or permitted accesses by the playback device, or a group of playback devices, to the content asset or one or more content assets. If so, then the content server may discontinue sending to the playback device any further content asset segments associated with that content asset.

20 Claims, 7 Drawing Sheets

Related U.S. Application Data continuation of application No. 16/127,967, filed on Sep. 11, 2018, now Pat. No. 10,701,419.

(51) Int. Cl.
 *G06F 21/62* (2013.01)
 *H04N 21/442* (2011.01)

(56) References Cited

U.S. PATENT DOCUMENTS

| | | | | |
|---|---|---|---|---|
| 6,982,780 | B2 * | 1/2006 | Morley | H04N 21/41415 |
| | | | | 352/38 |
| 8,483,393 | B2 * | 7/2013 | Robert | H04N 21/63345 |
| | | | | 380/278 |
| 10,162,943 | B2 * | 12/2018 | Park | H04L 63/08 |
| 10,701,419 | B2 * | 6/2020 | Cho | G06F 21/335 |
| 11,425,434 | B2 * | 8/2022 | Cho | G06F 21/335 |
| 2002/0121273 | A1 * | 9/2002 | Nyilas | A41D 13/1245 |
| | | | | 128/99.1 |
| 2004/0088737 | A1 * | 5/2004 | Donlan | H04N 7/165 |
| | | | | 725/135 |
| 2007/0294710 | A1 * | 12/2007 | Meesseman | H04L 41/22 |
| | | | | 719/328 |
| 2007/0294734 | A1 * | 12/2007 | Arsenault | H04N 21/25875 |
| | | | | 725/87 |
| 2008/0114880 | A1 * | 5/2008 | Jogand-Coulomb | H04L 61/30 |
| | | | | 709/227 |
| 2008/0194276 | A1 * | 8/2008 | Lin | H04L 61/5014 |
| | | | | 455/466 |
| 2008/0270462 | A1 * | 10/2008 | Thomsen | G06F 16/2471 |
| 2009/0133090 | A1 * | 5/2009 | Busse | H04N 21/4755 |
| | | | | 725/132 |
| 2010/0021512 | A1 * | 1/2010 | Arron | A61L 15/46 |
| | | | | 424/404 |
| 2010/0138297 | A1 * | 6/2010 | Fitzgerald | G06Q 30/0255 |
| | | | | 715/764 |
| 2010/0138298 | A1 * | 6/2010 | Fitzgerald | H04L 63/10 |
| | | | | 705/14.58 |
| 2010/0299264 | A1 * | 11/2010 | Berger | G06Q 30/0601 |
| | | | | 705/59 |
| 2013/0175333 | A1 * | 7/2013 | Gilbert | H04N 21/41407 |
| | | | | 235/375 |
| 2014/0373041 | A1 * | 12/2014 | Yan | H04N 21/4627 |
| | | | | 725/27 |
| 2020/0302031 | A1 * | 9/2020 | Park | H04L 67/306 |

* cited by examiner

MANAGING CONCURRENT CONTENT PLAYBACK

CROSS-REFERENCE TO RELATED APPLICATION

This application is a continuation of U.S. patent application Ser. No. 16/887,160, filed May 29, 2020, now U.S. Pat. No. 11,425,434, issued on Aug. 23, 2022, which is a continuation of U.S. patent application Ser. No. 16/127,967, filed Sep. 11, 2018, now U.S. Pat. No. 10,701,419, issued on Jun. 30, 2020, the entireties of which are incorporated herein by reference.

BACKGROUND

Service providers may impose a limit on a number of concurrent playbacks of content by one or more customers. For example, the content server may impose a limit on the number of streams made available to a playback device, to a particular household, or to a set of devices or households. Such restrictions are known as concurrency restrictions. Concurrency restrictions may be enforced at the time of acquisition of the content asset, e.g., where a playback device may obtain a token at the time of purchasing or beginning playback of the content asset. Systems may rely on the playback device to return the token after playback is complete. However, this may potentially cause problems at the content server. For example, a playback device may be susceptible to attacks by which a proxy between the playback device or client and the content server may trick the playback device into continuing to play the content asset. Additionally or alternatively, the playback device may be manipulated or otherwise fail to honor the concurrency checks. Therefore, it may be desirable to provide a system whereby a content server is responsible for managing and enforcing the concurrency policy on behalf playback devices.

SUMMARY

Methods and systems are disclosed for enforcing concurrency restrictions. A content server may receive from a user device a request for a content asset and may send to the user device permission (e.g., a permit) for accessing the content asset. The permit may be used by the content server in order to enforce a concurrency restriction, or a number of concurrent playbacks of one or more content assets desired or permitted by the user device. In response to receiving a request for a content asset segment associated with a content asset, the content server may determine whether the number of permits currently granted to one or more user devices comprising the user device exceeds the number of permitted accesses by the user device to the one or more content assets. If so, the content server may discontinue sending to the user device any further content asset segments associated with that content asset.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Concurrency restrictions may be imposed in order to limit a number of concurrent playback sessions of content assets by one or more customers. A content server may grant to a playback device a token that the playback device may use to access a content asset.

Figure 1:
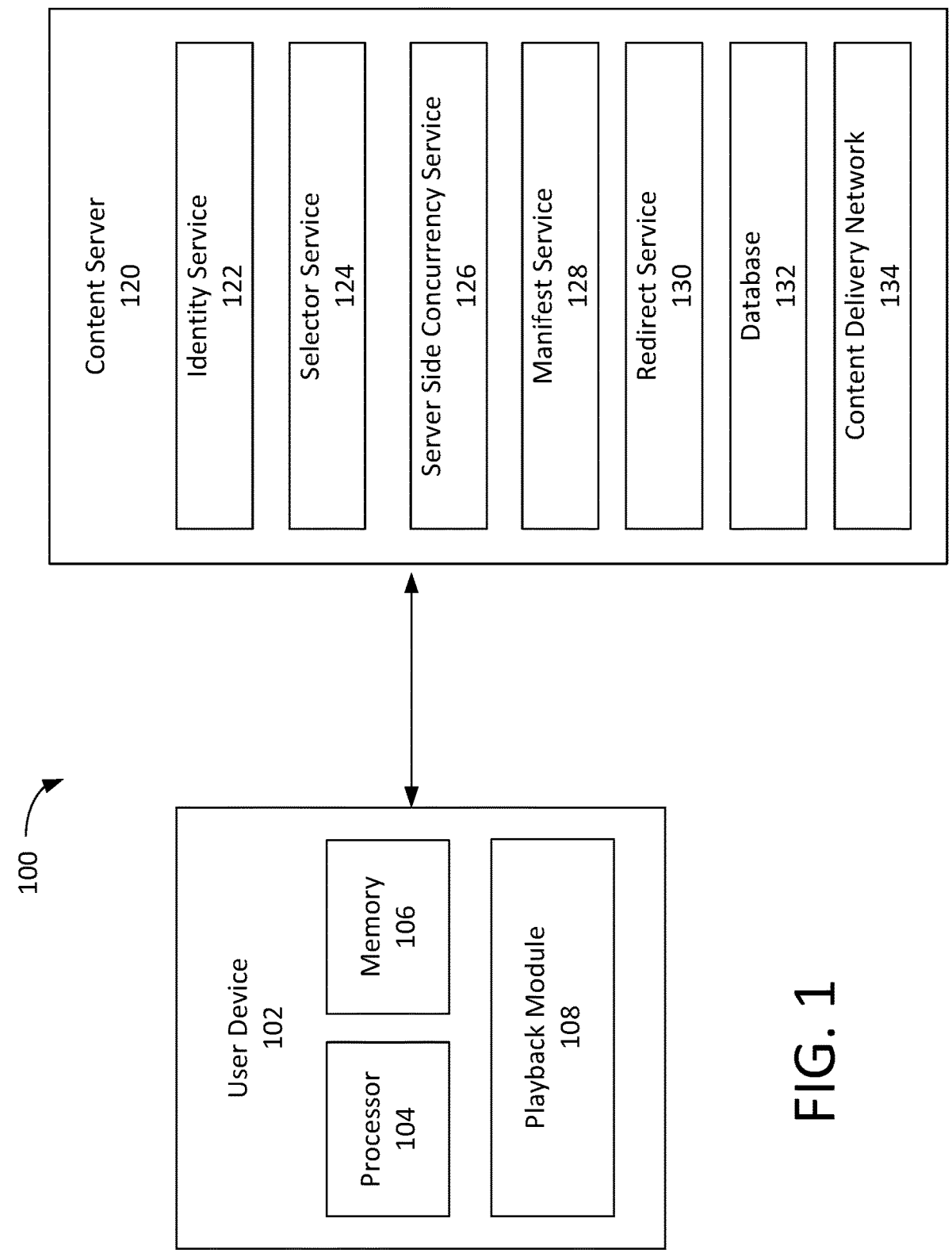
FIG. 1 is a block diagram of an example system.

FIG. 1 shows an example system 100 for enforcing concurrency restrictions. The system 100 may comprise a user device 102 and a content server 120. The system 100 may allow a content server 120 to enforce the concurrency restrictions without relying on the end user (e.g., the playback device) to enforce such restrictions.

The user device 102 may be configured to receive a content asset from the content server 120 and to cause playback of the content asset. The user device 102 may be a playback device, such as a desktop computer, a laptop, a television, a smartphone, a tablet, a virtual reality headset, or any other device capable of presenting playback of a content asset to a user of the playback device 102. The user device 102 may comprise a processor 104, a memory 106 and a playback module 108. The user device 102 may also be referred to herein as the playback device 102. However, it is understood that the user device 102 is not limited to a playback device and may comprise any type of device capable of being operated by a user.

The processor 104 may be configured to process information received from the content server 120 or from a user of the playback device 102. A user of the playback device 102 may generate a command using one or more functions of the playback device 102. The user may generate a command, for example, by pressing one or more buttons on the playback device 102, interacting with a user interface presented by the playback device 102, speaking to the playback device 102 using a microphone located on the playback device 102, or otherwise interacting with playback device 102. In response to receipt of a user command, such as a user pressing a "play" button (e.g., by clicking a mouse), the processor 104 may process the command and may execute the command by causing playback of a content asset selected by the user. Additionally or alternatively, the processor 104 may be configured to process one or more content assets received from the content server 120. The processor 104 may determine when to cause playback of the received content asset segments or may determine to queue one or more of the received content asset segments in the memory 106 for playback at a later time.

The memory 106 may be configured to store one or more content assets received from the content server 120. The playback device 102 may receive multiple content asset segments from the content server 120 and may need to store a portion of those content asset segments in the memory 106 until they are ready for playback. The memory 106 may comprise a queue configured to store a number of content asset segments such that they may be accessed for playback by the playback device 102 at a later time. The memory 106 may store additional items received from the content server, such as a manifest and one or more advertisements for playback to a user. Additionally or alternatively, the memory 106 may store user data such as user preferences and passwords.

The playback module 108 may be configured to cause playback of a content asset. The content asset may comprise any content capable of being played back by the playback device 102, such as a television asset, a movie asset, or content that is capable of being streamed via the Internet. The content asset may be in any one of a variety of formats, such as, for example, H.264, MPEG-4 Part 2, or MPEG-2. The content asset may be transmitted using one or more standards such as SCTE 35 or other specifications.

The content asset may comprise a plurality of content asset segments. The content asset segments may correspond to a portion of the content asset, such as a two second portion of the content asset. For example, a thirty minute television content asset may comprise nine hundred content asset segments, each being about two seconds in duration. There may be a manifest associated with the content asset that provides an identifier, such as a uniform resource identifier (URI), for each content asset segment. The identifier may be used by the playback device to request that a particular content asset segment be transmitted to the playback device from the content server. Each of the content asset segments that form the content asset may be sent to the playback device simultaneously. Additionally or alternatively, one or more of the content asset segments may be sent to the playback device 102 as they become available and/or as requested by the playback device 102. The playback module 108 may comprise a presentation component such as a television or a computer monitor or may otherwise be in communication with a presentation component in order to present the one or more content asset segments to a user of the playback device 102.

The content server 120 may be configured to send to the playback device 102 one or more content asset segments. The content server 120 may be operated by, for example, a cable provider, an Internet provider, a network provider, a content provider, a data provider, etc. As discussed herein, the content server 120 may be configured to enforce one or more policies, such as concurrency restrictions. The content server 120 may comprise one or more of an identity service 122, a selector service 124, a server side concurrency service 126, a manifest service 128, a redirect service 130, a database 132 and a content delivery network 134. A "service" as the term is used herein may comprise any type of hardware, software, or combination of hardware and software capable of preforming the functions described in connection with that service.

The identity service 122 may be configured to receive a request from the playback device 102 to access the content server 120. The identity service 122 may be configured to maintain a database of one or more playback devices identifiers and to authenticate a login by the one or more playback devices 102 using the one or more playback device identifiers. The identity service 122, in response to authenticating the login by the playback device 102, may be configured to send to the playback device 102 a token. The token may be used by the identity service 122 and/or any of the other entities associated with the content server 120 as proof that the playback device 102 has initiated a content session with the content server 120. The token may also be used by the one or more other entities in order to retrieve more detailed information about the playback device 102.

The selector service 124 may be configured to receive from the playback device 102 a request to access content provided by the content server 120. The request to access the content may comprise the token. The selector service 124 may be configured to determine one or more characteristics of the playback device and/or a one or more characteristics of a user of the playback device based on information contained in the token. For example, the selector service 124 may receive the request to access the content and determine an appropriate content asset for playback by the playback device 102. The selector service 124 may consider one or more characteristics or conditions, such as the type of playback device requesting content playback or a network bandwidth, in determining an appropriate content asset for playback by the playback device 102.

The selector service 124 may be configured to enforce one or more restrictions, such as one or more concurrency restrictions. The concurrency restrictions may be enforced in order to limit a number of concurrent playback sessions by one or more playback devices. However, it is understood that the selector service 124 may be configured to enforce any type of restriction, such as a geographic restriction. For example, the selector service 124 may determine that certain content is only available in North America. In response to receiving a request for the content from a playback device located in Europe, the selector service 124 may determine to reject that request for the content.

The server side concurrency service 126 may be configured to receive a request to acquire permission (e.g., a permit) for accessing one or more content assets. The permit may be any indication received at the playback device 102 that access to a content asset or portion of a content asset has been allowed by the content server 120. The server side concurrency service 126 may be configured to obtain the permit and to associate the permit with the token for the playback device 102. The token may be used by the server side concurrency service 126 to determine whether the playback device 102 is authorized to obtain a permit for accessing the one or more content assets. Concurrency restrictions may be imposed in order to control, e.g., limit, a number of concurrent playback sessions by one or more playback devices of one or more content assets. Thus, the number of active permits issued by the server side concurrency service may correspond to the number of desired or permitted concurrent playback sessions by the service provider. The number of desired concurrent playback sessions may include thresholds based on various considerations such as bandwidth, video processing availability and capability such as encoding and packaging, The manifest service 128 may be configured to receive a request for a content asset playlist from the playback device 102. The content asset playlist may be referred to herein and in the claims as a manifest. The content asset playlist may comprise one or more identifiers associated with the one or more content asset segments. Each identifier of a content assets segment may comprise a uniform resource identifier (URI) or locator (URL) that serves as a link to the content asset segment on the content delivery network 134. The manifest service 128 may be configured to alter the content playlist such that the links in the content playlist direct the playback device 102 to download the content asset segments from the redirect service 130. Thus, instead of downloading the content asset segment directly from the content delivery network 134, the playback device 102, upon selection of a link (e.g., URI/URL) in the playlist, may be directed to download the content asset segment from the redirect service 130. The manifest service 128 may be configured to alter each of the links in the playlist or to alter only a portion of the links in the playlist. For example, upon selection of a first link, the playback device 102 may be directed to download the content asset segment from the content delivery network 134, and upon selection of another link, the playback device 102 may be redirected to the redirect service 130.

The redirect service 130 may be configured to receive a request from the playback device 102 for a content asset segment. The playback device 102 may request the content asset segment using the one or more links in the playlist provided by the manifest service 128. The redirect service 130 may be configured to locate the content asset corresponding to the request and to send to the playback device 102 the content asset segment. The redirect service 130 may direct the playback device 102 to a location to retrieve the requested content asset segment. The redirect service 130, in response to receiving a request for a content asset segment from the playback device 102, may redirect the playback device 102 to the content delivery network 134 in order to retrieve the content asset segment. The request for a content asset segment may comprise an indication to update the permit associated with content asset segment. In response to receiving such a request, the redirect service may be configured to send to the server side concurrency service 126 an instruction to verify that the number of outstanding permits does not exceed the limit imposed by the content server 120.

The database 132 may be configured to store the one or more permits. The database 132 may be configured to receive from the server side concurrency service 126 a request to retrieve the outstanding permits for a given token. The request for the outstanding permits received from the server side concurrency service 126 may comprise information pertaining to the content asset and the user of the playback device 102. The database 132 may be configured to send the permits associated with the token to the server side concurrency service 126. In addition, the database 132 may be configured to delete one or more permits in response to a determination by the server side concurrency service 126 that the permit is expired (e.g., playback of the content asset has ended) or that the permit is the oldest permit of a number of outstanding permits, as discussed herein.

The content delivery network 134 may be configured to store (e.g., cache) one or more content asset segments. The content delivery network 134 may serve cached objects to playback device 102 and may manage some or all aspects of the cached objects of playback device 102. Such architecture may reduce the cost, resources, and bandwidth usage and may improve the security of playback device 102. For example, instead of validating the cached objects by committing various resources and using bandwidth to connect to a plurality of network-based resources, the playback device 102 may only need to request the validation from the content delivery network 134. In turn, the content delivery network 134 may connect to the plurality of network-based resources to refresh the cached objects and return the refreshed objects to playback device 102.

Figure 2:
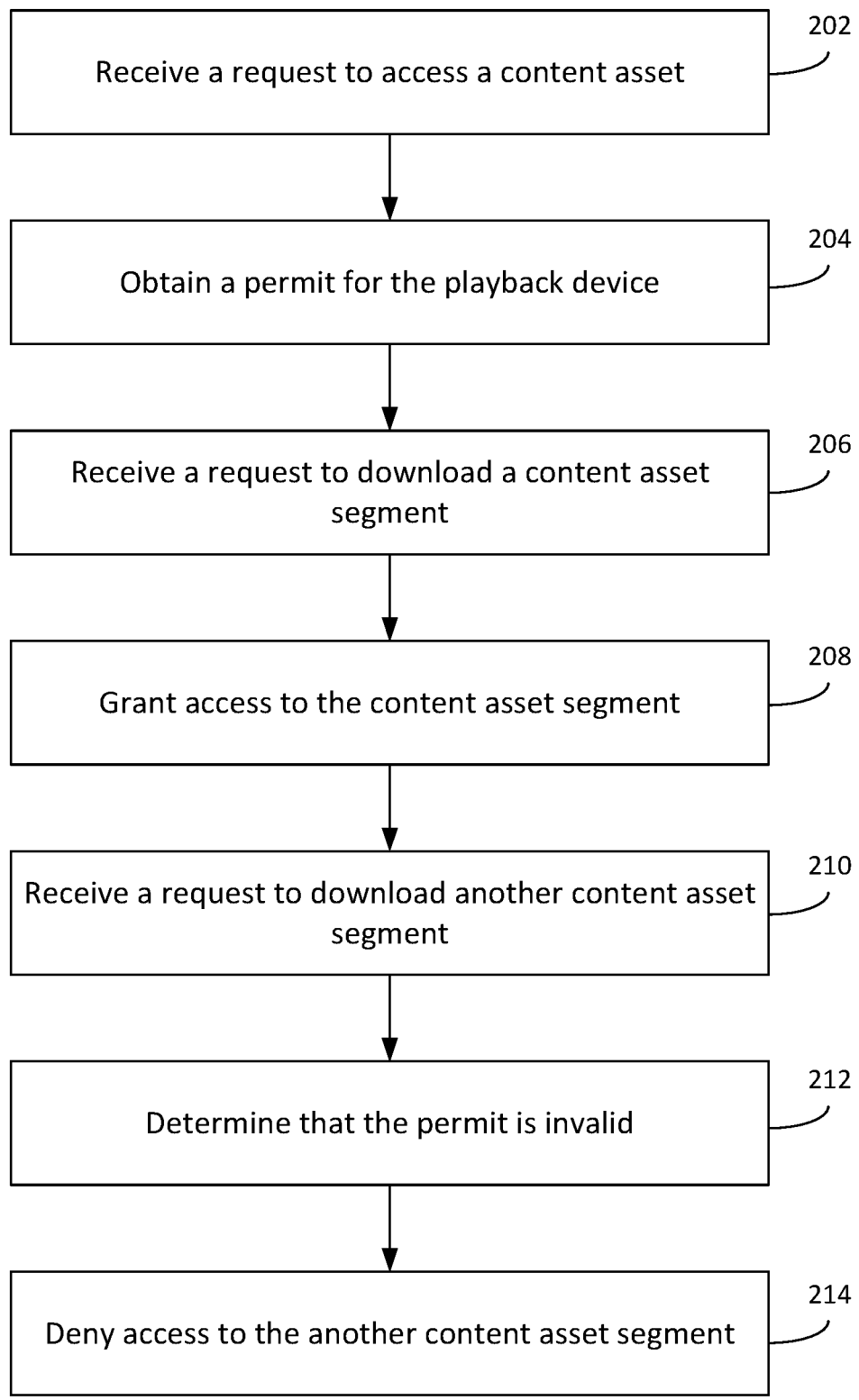
FIG. 2 is a flow chart of an example method.

FIG. 2 shows an example method in accordance with an aspect of the disclosure. At step 202, a request to access a content asset may be received. The request may be received from a playback device, such as the playback device 102 shown in FIG. 1. The content asset may comprise any content capable of being played back by the playback device, such as a television asset, a movie asset, or any content that is capable of being streamed via the Internet. The content asset may comprise a plurality of content asset segments. Each content asset segment may correspond to a portion of the content asset, such as a two-second portion of the content asset. The request for the content asset may be received at a content server, such as the content server 120 shown in FIG. 1. The request for the content asset may comprise a token. The token may be used by the playback device in requesting permission to access one or more content assets from the content server.

At step 204, permission may be obtained for the playback device. In one example, the permission may comprise a permit. However, it is understood that the permission is not limited to this example. The permit may grant to the playback device access to the content asset. The permit may be generated by a server side concurrency service, such as the server side concurrency service 126 shown in FIG. 1. The permit may be generated based on the token. The token may comprise information associated with one or more of an identifier associated with the playback device and an identifier associated with the content asset. The information may comprise metadata. The content server may additionally or alternatively be configured to send a playlist to the playback device. The playlist may comprise a plurality of links associated with the content asset. Each of the links may correspond to a given content asset segment.

At step 206, a request for a content asset segment may be received. The request may comprise an identifier of the content asset segment being requested. The playback device may select from the playlist a link corresponding to the content asset segment. Upon selection of the link to the content asset segment, the playback device may send to the content server the request for the content asset segment. The content asset segment may correspond to a portion of the content asset, such as a two-second portion of the content asset. The playlist may be periodically updated to reflect the newest available content asset segments. The request for the content asset segment may or may not comprise an indication to update the permit prior to granting access to the content asset.

At step 208, access to the content asset segment may be granted. If the request for the content asset segment does not comprise an indication to update the permit, the content server may grant access to the content asset segment without the need to update the permit. It is understood that all or only a portion of the one or more requests for content asset segments may comprise an indication to update the permit prior to granting access to the content asset segment by the playback device. For example, every fifth request for a content asset segment may comprise an indication to update the permit. Granting access to the content access segment by the playback device may comprise directing the playback device to a content delivery network to retrieve the content asset segment. Additionally or alternatively, the content server may determine to update the permit automatically in response to receiving the request for the content asset segment. The content server may be configured to update the permit each time a request for a content asset segment is received or may update the permit periodically.

At step 210, a request to download another content asset segment may be received. The request may comprise an identifier of the another content asset segment. The another content asset segment may be different than the content asset segment requested by the playback device at step 206. The playback device may select the link to the another content asset segment from the same playlist that contained the link to the content asset segment. Additionally or alternatively, the playback device may receive another playlist containing a link to the another content asset segment, and the playback device may be configured to select that link in order to request playback of the another content asset segment. Upon selection of the link to the another content asset segment, the playback device may send to the content server the request for the another content asset segment. The request to download the another content asset segment may comprise an indication to determine whether the number of permits associated with the token exceeds the desired or permitted number of concurrent playback sessions. The indication may be an indication to determine, prior to granting or denying access to the another content asset segment, after granting or denying access to the another content asset segment, and/or asynchronously with granting or denying access to the another content asset segment, whether the number of permits associated with the token exceeds the permitted number of concurrent playback sessions At step 212, it may be determined whether the number of permits associated with the token exceeds the permitted number of concurrent playback sessions. The content server may be configured to determine a number of outstanding permits associated with the one or more playback devices. The content server may be configured to retrieve from a database a number of permits associated with the token. The number of permits may correspond to the number of concurrent playback sessions permitted by the playback device to one or more content assets. The content server may compare the number of permits associated with the token to the number of concurrent playbacks permitted by the one or more playback devices.

At step 214, the playback device may be denied access to the another content asset segment. The content server may deny access to the another content asset segment by the playback device in response to determining that the number of outstanding permits exceeds the permitted number of concurrent playback sessions to one or more content assets by that playback device. The content server may send to the playback device an indication that access to the content asset segment has been denied. The content server may not send additional content asset segments to the playback device after determining that the number of permits exceeds the permitted number of concurrent playback sessions to one or more content assets by that playback device.

The content server may determine that a playback device is permitted to concurrently view two content assets. The content server, upon receiving a request from the playback device to access a first content asset, may be configured to obtain a first token for the playback device and may use the token to obtain a permit for accessing the first content asset. The playback device may use the permit to retrieve a playlist and to request one or more content asset segments associated with the first content asset. At a later time, the content server may receive a request to access a second content asset and a request to access a third content asset from the playback device. The content server, upon receiving a request from the playback device to access the content asset, may be configured to obtain a second token for the playback device and may use the second token to obtain a permit for accessing the second content asset. Further, the content server, upon receiving a request from the playback device to access the third content asset, may be configured to obtain a third token for the playback device and may use the token to obtain a permit for accessing the third content asset.

At an even later time, the content server may receive a request from the playback device for a content asset segment associated with the first content asset. The content server may determine that the number of outstanding permits associated with playback device (i.e., three) is greater than the number of concurrent views permitted by the playback device (i.e., two). In response to this determination, the content server may be configured to delete the oldest outstanding permit. Since the first permit was obtained prior to the second permit and the third permit, the content server may be configured to delete the first permit. The content server may be configured to send to the manifest server an indication that playback of further content asset segments associated with the first content asset should be denied. Since the first permit has been deleted and only two permits remain, the playback device may request playback of content asset segments associated with either of the second content asset or the third content asset.

Additionally or alternatively, the content server may receive a request from the playback device for a content asset segment associated with the first content asset and may determine that the playback session associated with the second content asset is expired. Thus, upon receiving the request for a content asset segment associated with the first content asset, the content server may be configured to delete any expired permits, such as the second permit associated with the second content asset. The content server may update the database to reflect that the second permit should be deleted. Thus, the playback device may request playback of content segments associated with either the first content asset or the third content asset. However, future requests for content asset segments associated with the second content asset may be denied by the content server as the second permit may no longer be valid.

Figure 3:
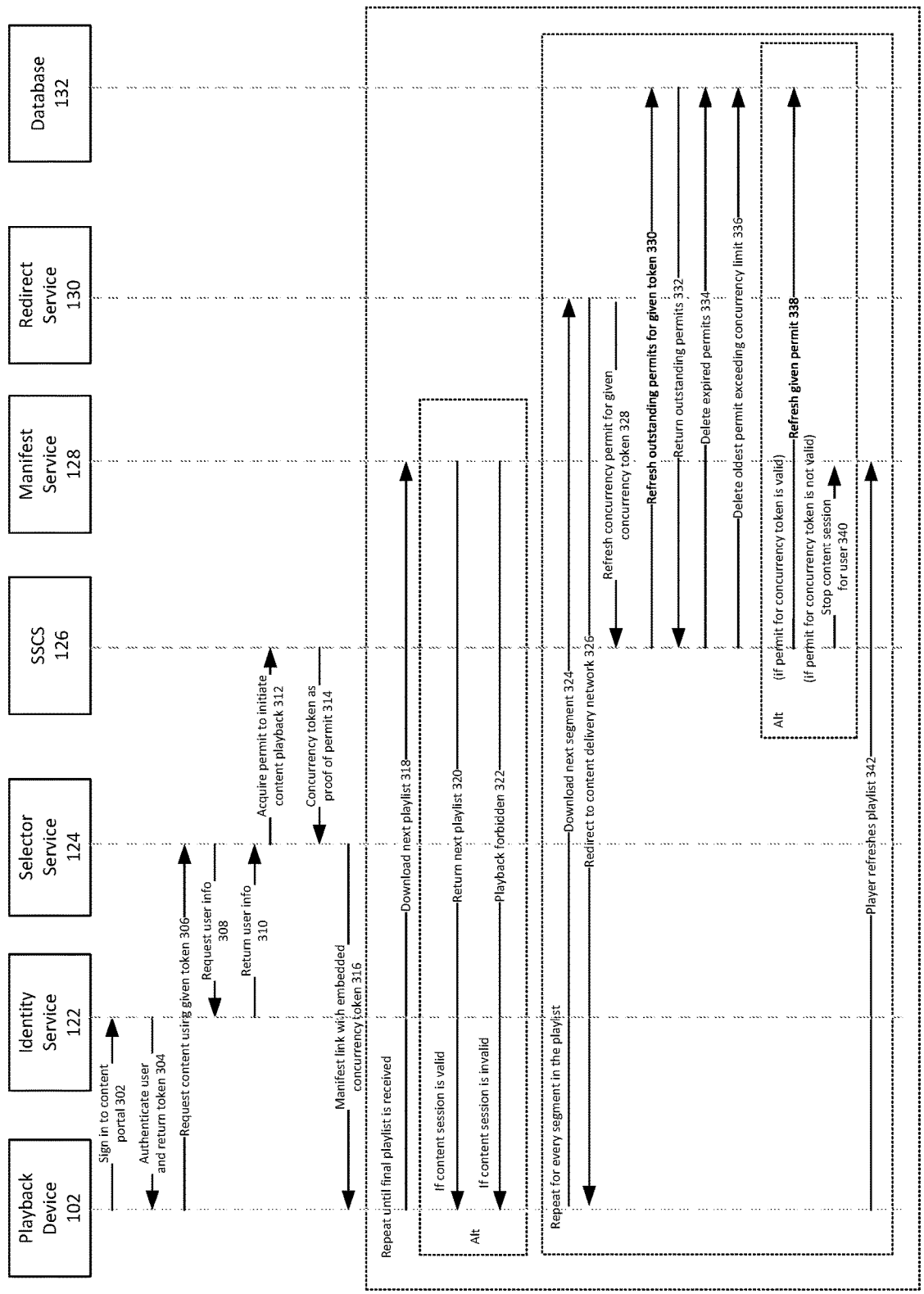
FIG. 3 is a flow chart of an example method.

FIG. 3 shows another method 300. The method 300 may be used by a playback device to request Internet Protocol (IP) Video Content from a content server. However, it is understood that the method 300 is not limited to IP video and may be used with any other types of protocols.

At step 302, a playback device may send, to an identity service, a request to access content from a content server. The playback device may be the playback device 102 shown in FIG. 1. The identity service may be the identity service 122 shown in FIG. 1. The request to access the content may comprise a request to "sign in" to the content server. Signing into the content server may comprise sending the selector service an identifier associated with the playback device and/or an identifier associated with a user of the playback device. The identity service may authenticate the playback device and/or the user of the playback device in order to determine whether or not access to the content server should be granted.

At step 304, the identity service may authenticate the playback device and/or the user of the playback device. Authenticating the playback device and/or the user of the playback device may comprise determining that the identifier associated with the device and/or user of the device matches one of a plurality of stored identifiers. In response to authenticating the playback device and/or the user of the playback device, the identity service may send to the playback device a token. The token may be used by the playback device in requesting a permit to access one or more content assets from the content server.

At step 306, the playback device may send to the selector service a request for a content asset. The content asset may comprise any content that is capable of playback by the playback device, such as a television asset, a movie asset, or any type of content asset made available for streaming over the Internet. The selector service may be the selector service 124 shown in FIG. 1. The request for the content asset may comprise one or more identifiers associated with the content asset. The request for the content asset may comprise one or more identifiers associated with the playback device and/or one or more identifiers associated with a user of the playback device. The request may additionally or alternatively comprise the token received from the identity service.

At step 308, the selector service may send to the identity service a request for information associated with the playback device and/or information associated with one or more users of the playback device. The information may include but is not limited to an identifier associated with the playback device, an identifier associated with the user, an email address associated with the user, an identifier of the household, an identifier of the service provider, and subscription level information such as certain channels that the playback device may have access to.

At step 310, the identity service may return the information associated with the playback device and/or information associated with one or more users of the playback device to the selector service.

At step 312, the selector service may send to the server side concurrency service a request for a permit. The server side concurrency service may be the server side concurrency service 126 shown in FIG. 1. The permit may grant by the playback device access to one or more content assets. The server side concurrency service, in response to receiving the request for a permit, may generate a permit for the playback device.

At step 314, the server side concurrency service may send to the selector service the permit. The permit may allow the playback device to access the particular content asset associated with the permit. The number of permits granted to one or more playback devices may correspond to a number of desired or permitted concurrent playbacks of one or more content assets provided by the content server.

At step 316, the selector service may send to the playback device a link to a manifest. The manifest may comprise a link to one or more playlists associated with the content asset. The one or more playlists may comprise one or more links to one or more content asset segments that can be requested by the playback device for playback. The manifest link may be embedded with the token.

At step 318, the playback device may request from the manifest service one or more playlists associated with the content asset. The playback device may select a link in the manifest, selection of the link causing the playback device to send to the manifest service a request for one or more playlists. The playlist may contain one or more links to one or more content asset segments. The playlist may need to be updated periodically to reflect changes to the one or more content asset segments. For example, as new content asset segments become available, the playback device may request a new playlist periodically in order to retrieve the new content asset segments. Additionally or alternatively, the playlist may contain one or more links corresponding to the entirety of the content asset.

At step 320, the manifest service, in response to determining that the content session is valid, may be configured to determine a content asset playlist for sending to the playback device and to send the content asset playlist to the playback device. The content asset playlist may be determined based on the information contained in the request for the content asset playlist, such as a device identifier and/or one or more characteristics of the playback device. Determining whether the content session is valid may comprise determining whether the permit associated with the content session is valid.

At step 322, the manifest service, in response to determining that the content session is invalid, may send to the playback device an indication that playback of the content asset is forbidden. The manifest service may send the playback device an indication that playback is forbidden in response to determining by the manifest service that the number of outstanding permits exceeds the number of desired or permitted accesses to one or more content assets offered by one or more playback devices.

At step 324, the playback device may send to the redirect service a request for a content asset segment. The redirect service may be the redirect service 130 shown in FIG. 1. The playback device may select one or more links in the playlist provided by the manifest service. Upon selection of the one or more links, the playback device may send to the redirect service the request for the content asset segment corresponding to that link. The request for the content asset segment may comprise an indication for the redirect service to update the permit associated with the token.

At step 326, the redirect service may send to the playback device a link to the content asset segment. The link may be a link to a content delivery network where the content asset segment may be retrieved by the playback device. The content delivery network may be the content delivery network 134 shown in FIG. 1. The content delivery network may be configured to serve cached content asset segments to playback device in response to requests for the content asset segment by the playback device.

At step 328, if the request comprises an indication to update the permit, the redirect service may send to the server side concurrency service a request to update the permit. Updating the permit may comprise determining that the number of permits associated with the token does not exceed the allowed number of concurrent playback sessions to one or more content assets by one or more playback devices. Additionally or alternatively, the redirect service may determine to update the permit regardless of whether the request for the content asset segment comprises a request to update the token. The redirect service may be configured to update the permit each time a request for a content asset segment is received, or at certain intervals (e.g., every third request).

At step 330, the server side concurrency service may send a request to the database to retrieve outstanding permits associated with the token. The database may be the database 132 shown in FIG. 1. The database may be configured to identify one or more permits associated with the token. For example, if the playback device is currently viewing a first content asset and a second content asset, the database may be configured to send to the playback device a first permit associated with the first content asset playback session and a second permit associated with the second content asset playback session.

At step 332, the database may send to the server side concurrency service the outstanding permits associated with the token. In the example above, the database may return the first permit and the second permit to the server side concurrency service. The server side concurrency service, upon receipt of the permits from the database, may be configured to determine whether the number of permits associated with the token exceeds the number of allowed concurrent playback sessions to content asset by the playback device.

At step 334, the server side concurrency service may determine to delete any expired permits. An expired permit may correspond to a content session that is no longer valid. For example, if the playback device has stopped viewing a given content asset, that permit may be considered to be expired. While the playback device may be responsible for notifying the content server that the playback device has finished viewing the content asset, the content server may not be able to rely on the playback device to update the content server each time playback has completed. The server side concurrency service may determine that a permit is expired, for example, if the content session has been closed out by the playback device or if the content session has not been active for a given time period.

At step 336, the server side concurrency service may delete the oldest permits exceeding the concurrency limit. For example, the content server may limit the number of concurrent playbacks by the playback device to one. The playback device may acquire a first permit on the token for playback of a first content asset and, at a later time, may acquire a second permit on the token for playback of a second content asset. The server side concurrency service, upon receiving a request to update the token associated with the second content session, may receive the first permit and the second permit from the database, determine that the first permit is the oldest permit exceeding the concurrency limit, and may delete the first permit.

At step 338, the server side concurrency service may send to the database an indication to refresh the permit. The server side concurrency service may send this indication in response to determining that the permit associated with the current playback session is valid (e.g., the permit is not expired and the permit was not deleted as the oldest permit exceeding the concurrency limit). Refreshing the permit may comprise updating the permit to reflect a last access time of a content asset associated with the permit.

At step 340, in response to determining that the token is not valid (e.g., in response to determining that the number of permits associated with the token exceeds the number of allowed concurrent playback sessions), the server side concurrency service may send to the manifest service an indication to stop the session. This may cause the manifest service to deny any future requests by the playback device for a content asset segment associated with the first content asset. However, the playback device may still be enabled to receive content asset segments associated with the second content asset as the permit associated with the second content asset may still be valid.

At step 342, the manifest service may receive from the playback device a request to refresh the playlist. The playback device may send this request in order to retrieve a new playlist containing the most recent content asset segments. The updated playlist may contain only new content asset segments or may contain a portion of the segments of the previous playlist and one or more new content asset segments.

Figure 4:
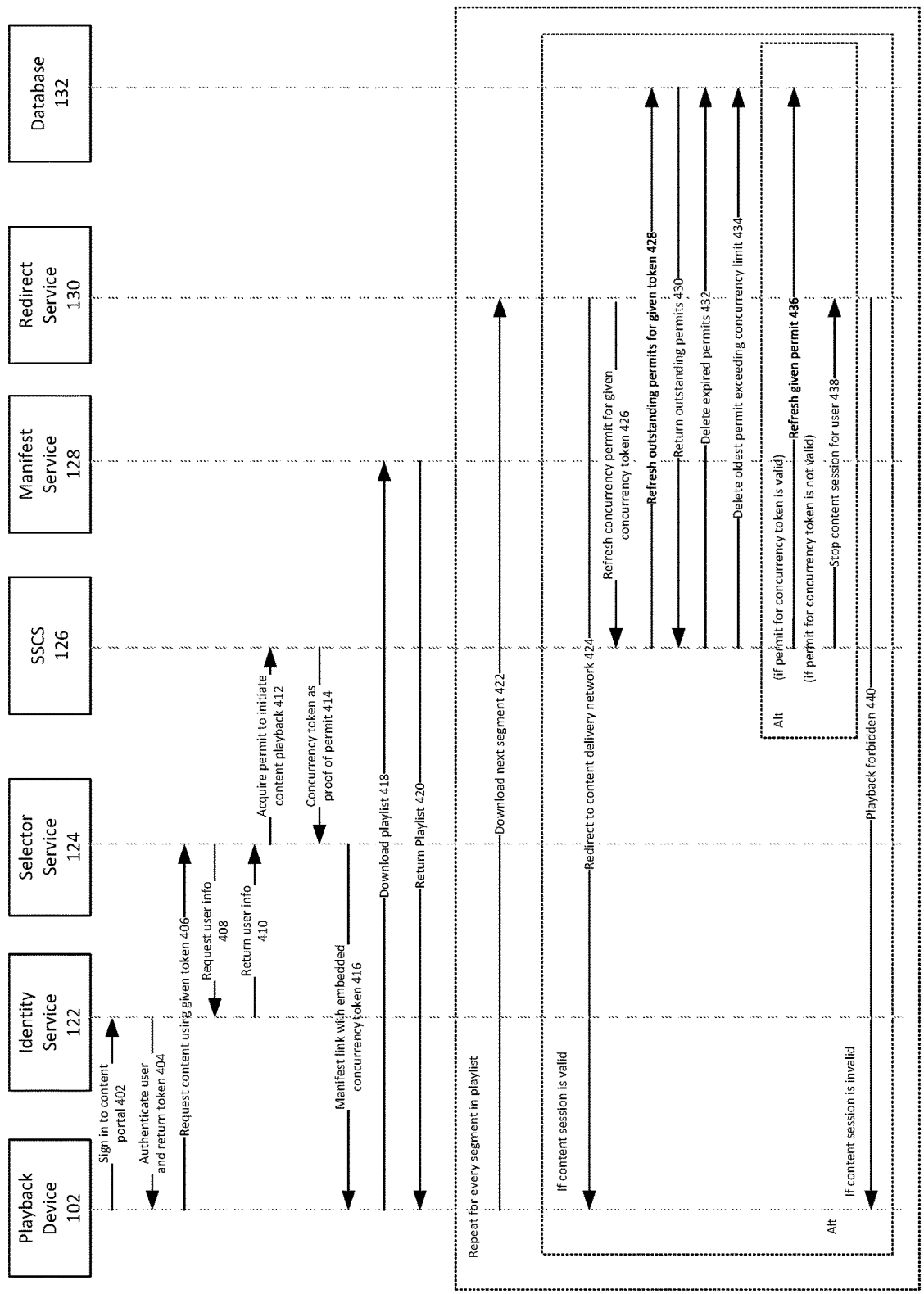
FIG. 4 is a flow chart of an example method.

FIG. 4 shows another method 400. The method 400 may be used by a playback device to request Video On Demand (VOD) Content from a content server. However, it is understood that the method 400 is not limited to VOD content and may be used with any other types of content protocols.

At step 402, the playback device may send, to the identity service, a request to sign into a content server. The playback device may be the playback device 102 shown in FIG. 1. The identity service may be the identity service 122 shown in FIG. 1. Signing into the content server may comprise sending the selector service an identifier associated with the playback device and/or an identifier associated with a user of the playback device. The identity service may authenticate the playback device and/or the user of the playback device based on the identifier to determine whether or not access to the content server should be granted.

At step 404, the identity service may authenticate the playback device and/or the user of the playback device. Authenticating the playback device may comprise determining that the playback device has access to the content server. The identity service may compare the device identifier of the playback device with a plurality of stored identifiers to determine that the playback device has access to the content server. Authenticating the user may comprise comparing a user identifier such as a user name and password with a plurality of stored user identifiers to determine that the user has access to the content server. Granting access to the content server may grant to the playback device access to one or more content assets stored in the content server. In response to authenticating the playback device and/or the user, the identity service may send to the playback device a token. The token may be used by the playback device in requesting a permit to access one or more content assets from the content server.

At step 406, the playback device may send to the selector service a request for a content asset. The content asset may comprise any content that is capable of playback by the playback device, such as a television asset, a movie asset, or any type of content asset made available for streaming over the Internet. The selector service may be the selector service 124 shown in FIG. 1. The request for the content asset may comprise one or more identifiers associated with the content asset. The request for the content asset may comprise one or more identifiers associated with the playback device and/or one or more identifiers associated with a user of the playback device. The request may additionally or alternatively comprise the token received from the identity service.

At step 408, the selector service may send to the identity service a request for information associated with the playback device and/or information associated with one or more users of the playback device. The information may include but is not limited to an identifier associated with the playback device, an identifier associated with the user, an email address associated with the user, an identifier of the household, an identifier of the service provider, and subscription level information such as certain channels that the playback device may have access to.

At step 410, the identity service may return the information associated with the playback device and/or information associated with one or more users of the playback device to the selector service.

At step 412, the selector service may send to the server side concurrency service a request for a permit. The server side concurrency service may be the server side concurrency service 126 shown in FIG. 1. The permit may grant by the playback device access to one or more content assets. The server side concurrency service, in response to receiving the request for a permit, may generate a permit for the playback device.

At step 414, the server side concurrency service may send to the selector service the permit. The permit may allow the playback device to access the particular content asset associated with the permit. The number of permits granted to one or more playback devices may correspond to a number of desired or permitted concurrent playbacks of one or more content assets provided by the content server.

At step 416, the selector service may send to the playback device a manifest link. The manifest may comprise a link to one or more playlists associated with the content asset. The one or more playlists may comprise one or more links to one or more content asset segments that can be requested by the playback device for playback. The manifest link may be embedded with the token.

At step 418, the playback device may request one or more playlists associated with the content asset. The playback device may select a link in the manifest, selection of the link causing the playback device to send to the manifest service a request for one or more playlists. The playlist may contain one or more links to one or more content asset segments. In the example of VOD content, the playlist may contain all of the links to the content asset segments for the requested content asset. However, it is understood that the playlist may contain only a portion of the links to the content asset segments.

At step 420, the manifest service, in response to determining that the content session is valid, may be configured to determine a content asset playlist for sending to the playback device and to send the content asset playlist to the playback device. The content asset playlist may be determined based on the information contained in the request for the content asset playlist, such as a device identifier and/or one or more characteristics of the playback device. Determining that the content session is valid may comprise determining that the number of outstanding permits does not exceed the number of desired or permitted accesses to one or more content assets by one or more playback devices.

At step 422, the playback device may send to the redirect service a request for a content asset segment. The redirect service may be the redirect service 130 shown in FIG. 1. The playback device may select one or more links in the playlist provided by the manifest service. Upon selection of the one or more links, the playback device may send to the redirect service the request for the content asset segment corresponding to that link. The request for the content asset segment may comprise an indication for the redirect service to update the permit associated with the token.

At step 424, the redirect service may send to the playback device a link to the content asset segment. The link may be a link to a content delivery network where the content asset segment may be retrieved by the playback device. The content delivery network may be the content delivery network 134 shown in FIG. 1. The content delivery network may be configured to serve cached content asset segments to playback device in response to requests for the content asset segment by the playback device.

At step 426, if the request comprises an indication to update the permit, the redirect service may send to the server side concurrency service a request to update the permit. Updating the permit may comprise determining that the number of permits associated with the token does not exceed the allowed number of concurrent playback sessions to one or more content assets by one or more playback devices. Additionally or alternatively, the redirect service may determine to update the permit regardless of whether the request for the content asset segment comprises a request to update the token. The redirect service may be configured to update the permit each time a request for a content asset segment is received, or at certain intervals (e.g., every third request).

At step 428, the server side concurrency service may send a request to the database to retrieve outstanding permits associated with the token. The database may be the database 132 shown in FIG. 1. The database may be configured to identify one or more permits associated with the token. For example, if the playback device is currently viewing a first content asset and a second content asset, the database may be configured to send to the playback device a first permit associated with the first content asset playback session and a second permit associated with the second content asset playback session.

At step 430, the database may send to the server side concurrency service the outstanding permits associated with the token. In the example above, the database may return the first permit and the second permit to the server side concurrency service. The server side concurrency service, upon receipt of the permits from the database, may be configured to determine whether the number of permits associated with the token exceeds the number of allowed concurrent playback sessions to content asset by the playback device.

At step 432, the server side concurrency service may determine to delete any expired permits. An expired permit may correspond to a content session that is no longer valid. For example, if the playback device has stopped viewing a given content asset, that permit may be considered to be expired. While the playback device may be responsible for notifying the content server that the playback device has finished viewing the content asset, the content server may not be able to rely on the playback device to update the content server each time playback has completed. The server side concurrency service may determine that a permit is expired, for example, if the content session has been closed out by the playback device or if the content session has not been active for a given time period.

At step 434, the server side concurrency service may delete the oldest permits exceeding the concurrency limit. For example, the content server may limit the number of concurrent playbacks by the playback device to one. The playback device may acquire a first permit on the token for playback of a first content asset and, at a later time, may acquire a second permit on the token for playback of a second content asset. The server side concurrency service, upon receiving a request to update the token associated with the second content session, may receive the first permit and the second permit from the database, determine that the first permit is the oldest permit exceeding the concurrency limit, and may delete the first permit.

At step 436, the server side concurrency service may send to the database an indication to refresh the permit. The server side concurrency service may send this indication in response to determining that the permit associated with the current playback session is valid (e.g., the permit is not expired and the permit was not deleted as the oldest permit exceeding the concurrency limit). Refreshing the permit may comprise updating the permit to reflect a last access time of a content asset associated with the permit.

At step 438, in response to determining that the token is not valid (e.g., in response to determining that the number of permits associated with the token exceeds the number of allowed concurrent playback sessions), the server side concurrency service may send to the redirect service an indication to stop the session. This may cause the manifest service to deny any future requests by the playback device for a content asset segment associated with the first content asset. However, the playback device may still be enabled to receive content asset segments associated with the second content asset as the permit associated with the second content asset may still be valid.

At step 440, the redirect service, in response to determining that the content session is invalid, may send to the playback device an indication that playback of the content asset is forbidden. The redirect service may send the playback device an indication that playback is forbidden in response to determining by the redirect service that the number of outstanding permits does exceeds the number of desired or permitted accesses to one or more content assets offered by one or more playback devices.

Figure 5:
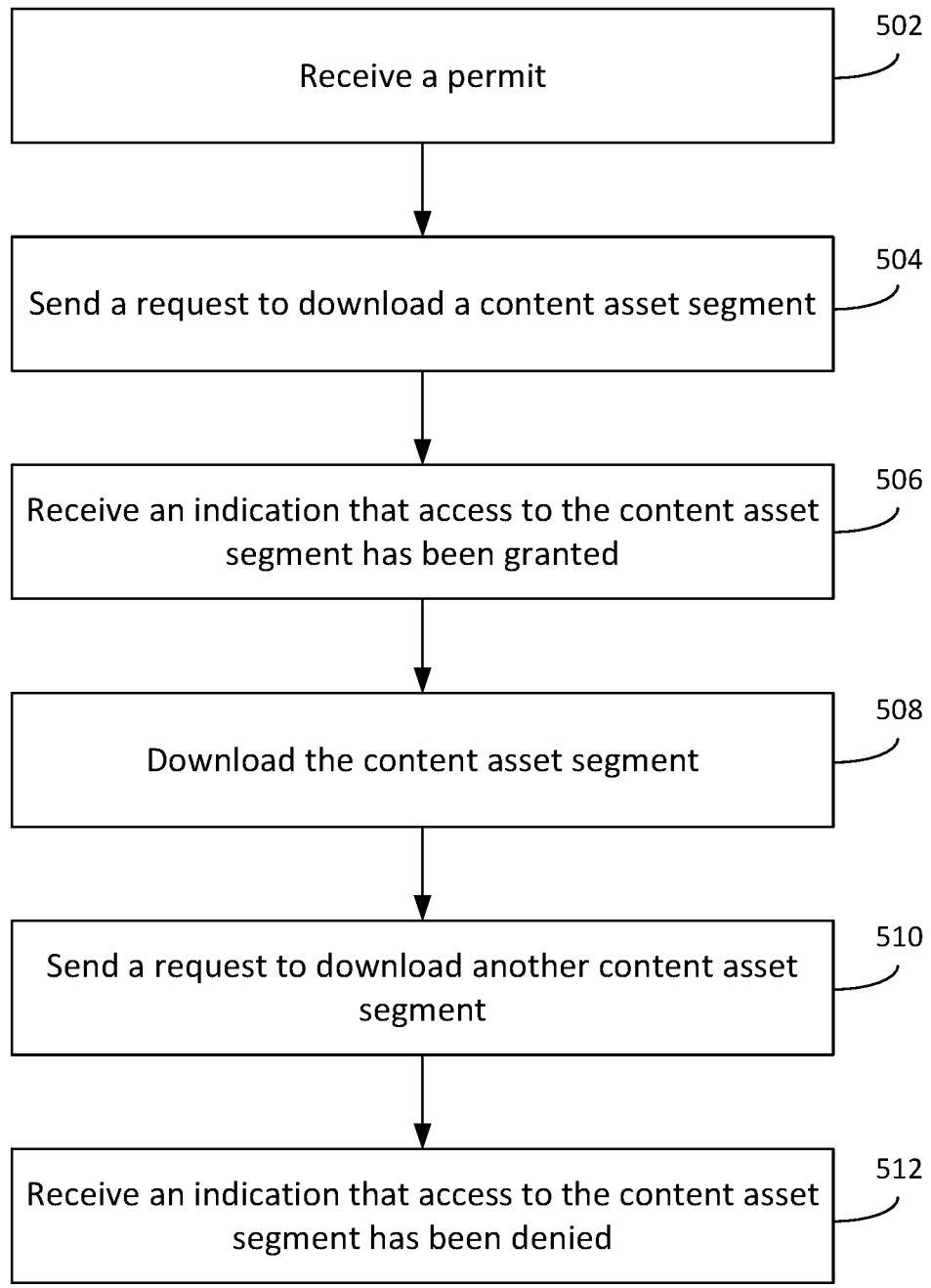
FIG. 5 is a flow chart of an example method.

FIG. 5 shows an example method for determining whether a playback device has exceeded a concurrency limit. At step 502, permission may received by a playback device for accessing content. In one example, the permission may comprise a permit. However, it is understood that the permission is not limited to this example. The playback device may be, for example, the playback device 102 shown in FIG. 1. The permit may grant to the playback device access to a content asset. The content asset may comprise any content capable of being played back by the playback device, such as a television asset, a movie asset, or any content that is capable of being streamed via the Internet. The content asset may comprise a plurality of content asset segments. The content asset segments may correspond to a portion of the content asset, such as a two second portion of the content asset.

The permit may be generated by a server side concurrency service, such as the server side concurrency service 126 shown in FIG. 1. The permit may be generated based on the token. The token may comprise information associated with one or more of an identifier associated with the playback device and an identifier associated with the content asset. The information may comprise metadata. The content server may additionally or alternatively be configured to send a playlist to the playback device. The playlist may comprise a plurality of links associated with the content asset. Each of the links may correspond to a given content asset segment.

At step 504, a request for a content asset segment may be sent to a content server 120. The request may comprise an identifier of the content asset segment being requested. The playback device may select from the playlist a link corresponding to the content asset segment. Upon selection of the link to the content asset segment, the playback device may send to the content server the request for the content asset segment. The content asset segment may correspond to a portion of the content asset, such as a two-second portion of the content asset. The playlist may be periodically updated to reflect the newest available content asset segments. The request for the content asset segment may or may not comprise an indication to update the permit prior to granting access to the content asset.

At step 506, the playback device may receive from the content server an indication that access to the content asset segment has been granted. If the request for the content asset segment did not comprise an indication to update the permit, the content server may grant access to the content asset segment without the need to update the permit. It is understood that all or only a portion of the one or more requests for content asset segments may comprise an indication to update the permit prior to granting access to the content asset segment by the playback device. For example, every fifth request for a content asset segment may comprise an indication to update the permit. Granting access to the content access segment by the playback device may comprise directing the playback device to a content delivery network to retrieve the content asset segment. Additionally or alternatively, the content server may determine to update the permit automatically in response to receiving the request for the content asset segment. The content server may be configured to update the permit each time a request for a content asset segment is received or may update the permit periodically.

At step 508, the content asset segment may be downloaded. In one example, receiving an indication that access to the content asset has been granted may comprise receiving a link to a content delivery network to retrieve the content asset segment. Thus, the playback device may be configured to retrieve the content asset segment from the content delivery network and to cause playback of the content asset segment via one or more displays associated with the playback device.

At step 510, a request to download another content asset segment may be sent. The request may comprise an identifier of the another content asset segment. The another content asset segment may be different than the content asset segment requested by the playback device at step 504. The playback device may select the link to the another content asset segment from the same playlist that contained the link to the content asset segment. Additionally or alternatively, the playback device may receive another playlist containing a link to the another content asset segment, and the playback device may be configured to select that link in order to request playback of the another content asset segment. Upon selection of the link to the another content asset segment, the playback device may send to the content server the request for the another content asset segment. The request to download the another content asset segment may comprise an indication to determine, prior to granting or denying access to the another content asset segment, whether the number of permits associated with the token exceeds the permitted or desired number of concurrent playback sessions by the playback device.

At step 512, the playback device may receive an indication that access to the another content asset segment has been denied. The content server may deny access to the content asset segment by the playback device in response to determining that the number of outstanding permits exceeds the desired or permitted number of concurrent playback sessions to one or more content assets by that playback device. The content server may send to the playback device an indication that access to the content asset segment has been denied. The content server may not send additional content asset segments to the playback device after determining that the number of permits exceeds the permitted number of concurrent playback sessions to one or more content assets by that playback device.

Figure 6:
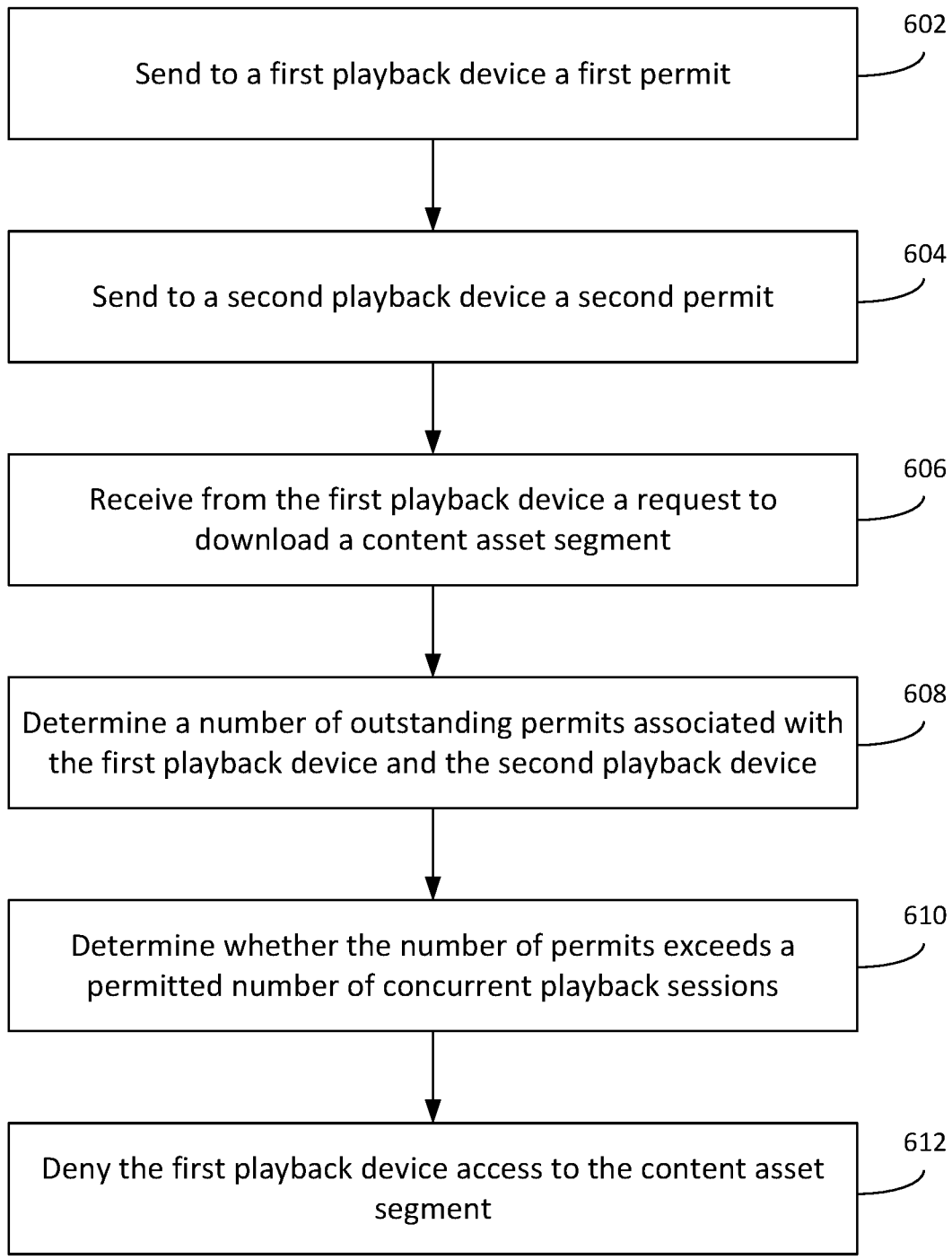
FIG. 6 is a flow chart of an example method.

FIG. 6 shows an example method for determining whether a plurality of playback devices have exceeded a concurrency limit. At step 602, a first permission may be sent to a first playback device for accessing content. In one example, the first permission may comprise a first permit. However, it is understood that the permission is not limited to this example. The first permit may be sent by a content server, such as the content server 120 shown in FIG. 1, to the first playback device in response to receipt at the content server from the first playback device of a request for a first content asset. The permit may grant to the first playback device access to the first content asset. The first content asset may comprise one or more content asset segments. The first permit may be associated with a first token generated by the content server.

At step 604, a second permission may be sent to a second playback device for accessing content. In one example, the second permission may comprise a second permit. However, it is understood that the permission is not limited to this example. The second permit may be sent by a content server, such as the content server 120 shown in FIG. 1, to the second playback device in response to receipt at the content server from the second playback device of a request for a second content asset. The permit may grant to the second playback device access to the second content asset. The second content asset may comprise one or more content asset segments. The second content asset may be a different content asset than the first content asset. The second permit may be associated with a second token generated by the content server. Each of the first playback device and the second playback device may be one of a desktop computer, a laptop, a tablet, a smartphone, or a set-top box. The second playback device may be a different type of playback device than the first playback device.

At step 606, a request to download a content asset segment associated with the first content asset may be received from the first playback device. The request to download the content asset segment may comprise an indication to determine, prior to granting or denying access to the content asset segment, whether the number of outstanding permits associated with the first playback device and the number of outstanding permits associated with the second playback device exceeds the number of available permits for the first playback device and the second playback device. Receiving the request to download the content asset segment may comprise receiving from the first playback device the first token.

At step 608, a number of outstanding permits associated with the first playback device and the second playback device may be determined. The number of permits may be determined based on information associated with the first permit and/or information associated with the first token. The information may comprise, for example, one or more of an identifier of the first playback device and an identifier of the second playback device, and an identifier of an account associated with the first playback device and the second playback device. The information may enable the content server to determine that the first playback device associated with the first token is related to the second playback device associated with the second token. For example, the information may indicate that the first playback device and the second playback device are located in the same household and/or are associated with the same account. Thus, a given concurrency restriction may apply to the first playback device and the second playback device.

At step 610, it may be determined whether the number of outstanding permits associated with the first token and the number of outstanding permits associated with the second token exceeds the number of available permits for the first token and the second token. For example, if the concurrency restriction for the account associated with the first playback device and the second playback device is two concurrent playbacks, and the first playback device is currently viewing a first content asset and a second content asset while the second playback device is currently viewing a third content asset, the content server may determine that the number of outstanding permits exceeds the number of available permits.

At step 612, the playback device may be denied access to the content asset in response to the content server determining that the number of outstanding permits exceeds the number of available permits. In the example above, in response to the first playback device requesting playback of the second content asset, the content server may determine that the concurrency limit has been exceeded. The content server may delete the permit associated with the second content asset in response to determining, for example, that the playback session associated with the second content asset has expired or that the permit associated with the second content asset is the oldest permit exceeding the concurrency limit. Thus, the first playback device may be prevented from requesting any additional content asset segments associated with the second content asset.

Figure 7:
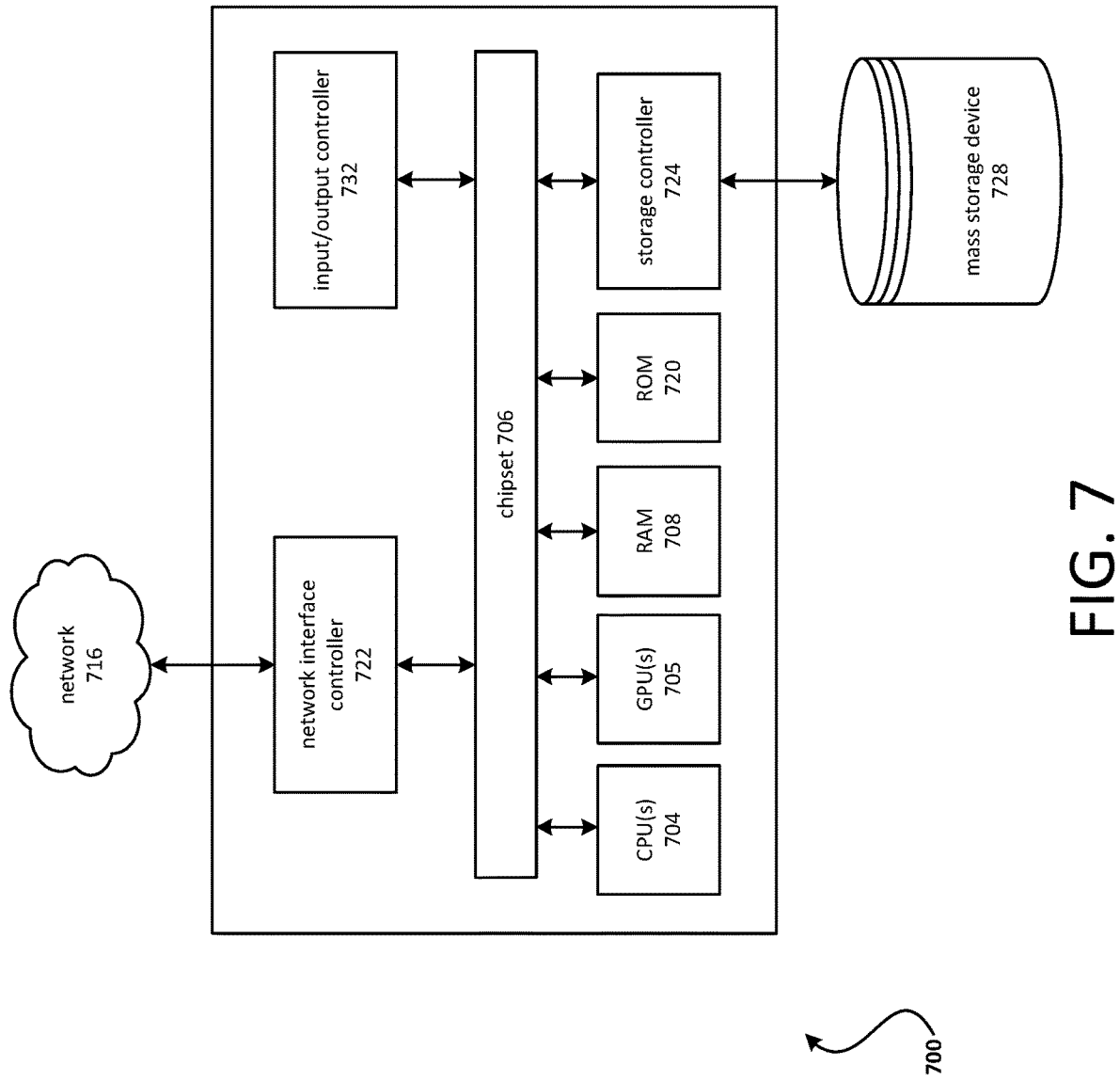
FIG. 7 is a block diagram of an example computing device.

FIG. 7 depicts a computing device that may be used in various aspects, such as the servers, modules, and/or devices depicted in FIG. 1. With regard to the example architecture of FIG. 1, the playback device 102, server 120, and/or the audio device 140 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example

The invention claimed is:

1. A method comprising:
   receiving, by a user device and from a content server, an indication of a permission granting the user device access to a content asset;
   sending, by the user device and to the content server, a request for a segment of the content asset; and
   receiving, by the user device, from the content server, and based on a determination by the content server that the number of permissions currently granted to the user device exceeds the number of desired concurrent communication sessions by the user device, an indication that access to the another segment of the content asset has been denied.

2. The method of claim 1, wherein the request for the segment comprises an indication to determine, prior to granting or denying access to the segment, whether the number of permissions currently granted to the user device exceeds the number of desired concurrent communication sessions by the user device.

3. The method of claim 1, wherein the indication of the permission is generated in response to receipt at the content server of a token associated with the user device.

4. The method of claim 3, wherein the token comprises information associated with at least one of an identifier of the user device and an identifier of the content asset.

5. The method of claim 1, further comprising receiving, from the content server, a playlist comprising a plurality of links associated with the content asset, the plurality of links comprising at least a first link associated with the segment.

6. The method of claim 1, wherein receiving an indication that access to the segment has been granted comprises receiving a link to a content delivery network to retrieve the segment.

7. The method of claim 1, wherein the number of permissions currently granted to the user device is stored in a database associated with the content server.

8. An apparatus comprising:
   one or more processors; and
   memory storing instructions that, when executed by the one or more processors, cause the apparatus to:
      receive, by a user device and from a content server, an indication of a permission granting the user device access to a content asset;
      send, by the user device and to the content server, a request for a segment of the content asset;
      receive, by the user device, from the content server, and based on a determination by the content server that the number of permissions currently granted to the user device exceeds the number of desired concurrent communication sessions by the user device, an indication that access to the another segment of the content asset has been denied.

9. The apparatus of claim 8, wherein the request for the segment comprises an indication to determine, prior to granting or denying access to the segment, whether the number of permissions currently granted to the user device exceeds the number of desired concurrent communication sessions by the user device.

10. The apparatus of claim 8, wherein the indication of the permission is generated in response to receipt at the content server of a token associated with the user device.

11. The apparatus of claim 10, wherein the token comprises information associated with at least one of an identifier of the user device and an identifier of the content asset.

12. The apparatus of claim 8, wherein the instructions, when executed, further cause the apparatus to:
   receive, from the content server, a playlist comprising a plurality of links associated with the content asset, the plurality of links comprising at least a first link associated with the segment.

13. The apparatus of claim 8, wherein receiving an indication that access to the segment has been granted comprises receiving a link to a content delivery network to retrieve the segment.

14. The apparatus of claim 8, wherein the number of permissions currently granted to the user device is stored in a database associated with the content server.

15. A computer-readable medium storing instructions that, when executed, cause:
   receiving, by a user device and from a content server, an indication of a permission granting the user device access to a content asset;
   sending, by the user device and to the content server, a request for a segment of the content asset; and
   receiving, by the user device, from the content server, and based on a determination by the content server that the number of permissions currently granted to the user device exceeds the number of desired concurrent communication sessions by the user device, an indication that access to the another segment of the content asset has been denied.

16. The computer-readable medium of claim 15, wherein the request for the segment comprises an indication to determine, prior to granting or denying access to the segment, whether the number of permissions currently granted to the user device exceeds the number of desired concurrent communication sessions by the user device.

17. The computer-readable medium of claim 15, wherein the indication of the permission is generated in response to receipt at the content server of a token associated with the user device.

18. The computer-readable medium of claim 17, wherein the token comprises information associated with at least one of an identifier of the user device and an identifier of the content asset.

19. The computer-readable medium of claim 15, wherein the instructions, when executed, further cause:
   receiving, from the content server, a playlist comprising a plurality of links associated with the content asset, the plurality of links comprising at least a first link associated with the segment.

20. The computer-readable medium of claim 15, wherein receiving an indication that access to the segment has been granted comprises receiving a link to a content delivery network to retrieve the segment.

* * * * *